UNITED STATES PATENT OFFICE.

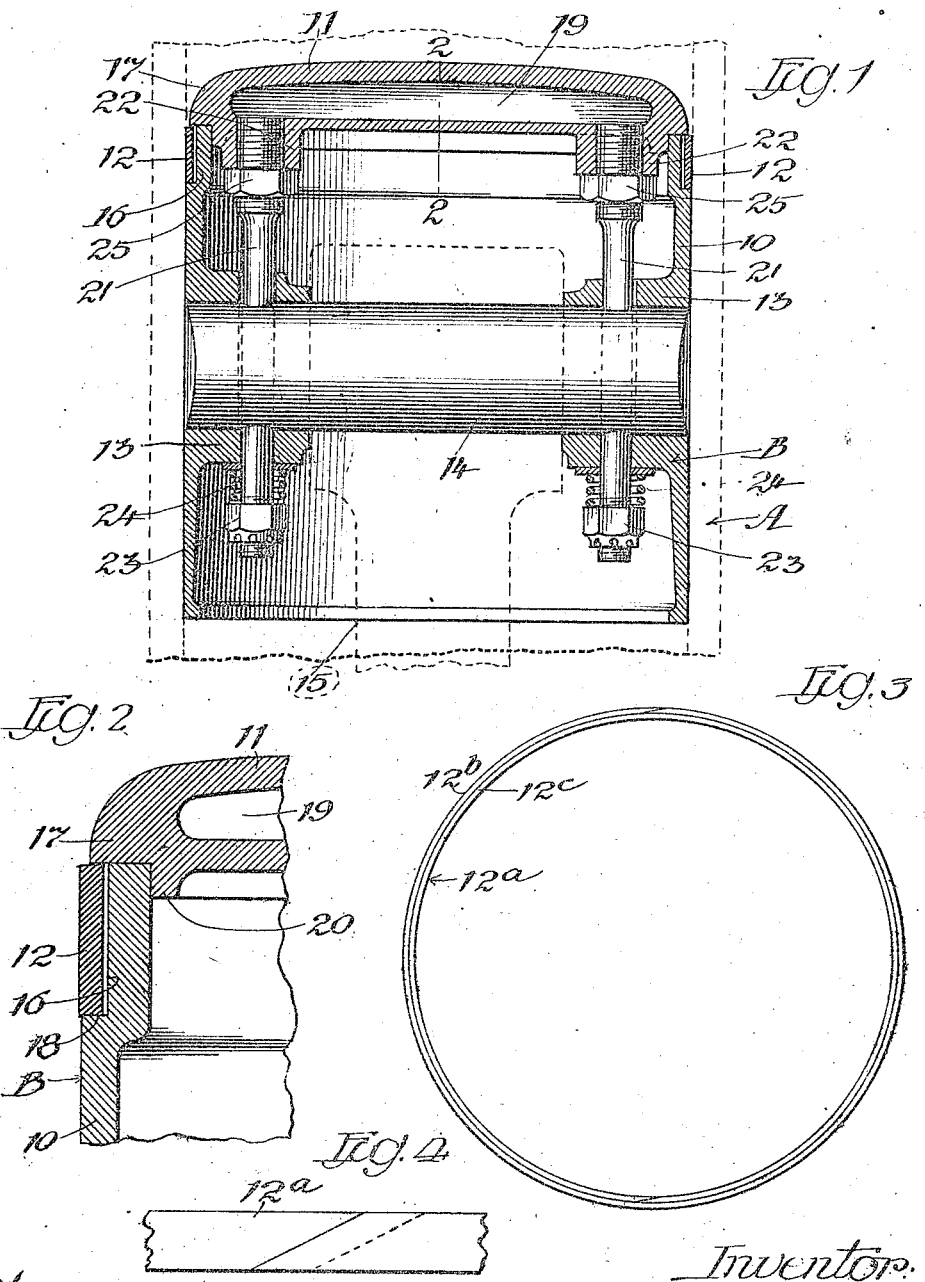

GEORGE R. RICH, OF OAK PARK, ILLINOIS.

PISTON FOR INTERNAL-COMBUSTION ENGINES.

1,228,048.                Specification of Letters Patent.        Patented May 29, 1917.

Application filed December 8, 1915. Serial No. 65,645.

*To all whom it may concern:*

Be it known that I, GEORGE R. RICH, a citizen of the United States, and a resident of Oak Park, county of Cook, and State of Illinois, have invented certain new and useful Improvements in Pistons for Internal-Combustion Engines, of which the following is declared to be a full, clear, and exact description.

This invention relates to pistons for internal combustion engines and its primary object is to provide improved means for compensating for expansion of the piston when subjected to the high temperatures developed in combustion or explosion engines. The greatest amount of heat is developed above and at the top of the piston, consequently the top or head and upper end of the side wall of the piston are subject to a greater range of expansion and contraction than the lower part thereof. To provide for this unequal expansion, I construct the upper end of the piston in such manner that the head and upper end may expand without binding against the internal cylinder wall. This result I have accomplished by providing an annular groove at the upper end of the annular piston wall in which groove is placed a piston ring, the internal diameter of which is greater than the external diameter of the grooved end of the annular piston wall, whereby the head and grooved end of said wall may expand without binding the ring against the internal face of the cylinder. The invention consists, therefore, in the several novel features of construction, arrangement and combination of parts hereinafter fully set forth and claimed.

The invention is clearly illustrated in the accompanying drawing, in which:

Figure 1, is a central, vertical section through a fragment of an internal combustion engine cylinder, and through a piston therein, embodying a simple form of the present invention; Fig. 2, is a detail, vertical section taken on line 2—2 of Fig. 1; Fig. 3, is a plan of a modified form of a piston ring used in connection with the piston; and Fig. 4 is a detail side view of a fragment of one of the piston rings seen in Fig. 3.

In the embodiment of the invention illustrated in said drawing, A, designates a fragment of an internal combustion engine cylinder, and B, the piston therein. Preferably only sufficient clearance is left between the wall of the cylinder and piston to allow for lubricating oil.

In its preferred form the piston comprises a cylindrical wall 10, a piston head 11, secured thereon, and a piston ring 12, located in a groove 16, at the upper end of the wall 10. On the inner face of the wall 10, are formed two hollow bosses 13, in which is secured the wrist pin 14; the connecting rod 15, is secured to the wrist pin as usual.

The upper end of the wall 10, is formed with the annular groove 16, above referred to, in which is placed the piston ring 12, and said ring is preferably solid, and bears against the internal face of the cylinder wall A; it rests upon the shoulder 18, formed at the bottom of the groove 16. Space is left between the ring and face of the groove to permit the expansion of the upper end of the piston wall 10, independently of the ring 12, so that in expanding it does not unnecessarily crowd the ring against the inner face of the cylinder.

The head 11, is preferably formed with a chamber or dead air space 19, for the purpose of keeping the lower face of the head comparatively cool to thereby minimize the injurious effect of the otherwise hot face of the piston on the lubricating oil which is splashed against said face.

The edge portion 17, of the head seats on the upper edge of the piston wall 10, and overhangs the same somewhat, although the head is of less diameter than the bore of the cylinder to allow for expansion. The piston ring 12, it will be observed, is confined in the groove at the top of the piston wall by said overhanging edge portion 17, of the head and shoulder 18, of the groove. If desired the head may have an annular downwardly projecting shoulder 20, fitting against the inner face of the piston wall 10.

The head 11, and piston wall 10, are secured together as for instance by pins 21, threaded at both ends and screwed into threaded bosses 22, formed on the lower face of the head; said pins extend through apertures in the hollow bosses 13, and wrist pin, and have nuts 23, threaded upon their lower ends which bear against coiled compression springs 24, confined under compression between the hollow bosses 13, and nuts 23. The nuts 23, are screwed up tight to compress the springs sufficiently to hold the head 11, on its seat during the suction strokes of the piston. If desired set nuts 25, may be employed on the threaded upper ends of the pins, and turned up against the ends of the bosses 22, to lock the pins to the head.

If desired the apertures in the bosses 13, and wrist pin 14, may be elongated in a direction parallel with the axis of the wrist pin to permit lateral play of the pins, due to the sidewise movement caused by the expansion and contraction of the head 11.

In Figs. 3, and 4, a double, split piston ring 12ª is shown, which may be used in place of the solid ring shown in the preferred form. Said double ring comprises two thin narrow split rings, one within the other. Each individual ring 12ᵇ, 12ᶜ, is split obliquely as shown in Fig. 4, and the edges of the split ends are tapered (see Fig. 3) as is usual in split rings of this class.

In operation the head expands under the influence of the hot temperatured gases to which it is subjected in an internal combustion engine, and it carries the upper end of the annular piston wall with it, but because of the clearance left between the reduced end of the annular piston wall and piston ring, it is free to expand without binding the piston ring against the inner wall of the cylinder. Obviously some heat is conducted to said side wall of the piston but on account of the water cooled cylinder wall much of said heat is conducted to said wall and conducted to the water where a cooling action takes place, so that whatever expansion of the annular piston wall takes place below the reduced end, it may be regarded as a negligible quantity, particularly as the cylinder also expands.

More or less variation of the exact details of construction is possible without departing from the spirit of this invention, and I desire, therefore, not to limit myself to the exact form of the invention shown and described, but intend in the following claims to point out all of the invention disclosed herein.

I claim as new and desire to secure by Letters Patent:

1. A piston for internal combustion engines, comprising an annular piston wall, having an annular groove in its external face at one end and formed on its internal wall with two hollow bosses, a wrist pin seated in said bosses, a separate head of less diameter than the annular piston wall, seated on said groove end and having a peripheral edge overhanging said groove, a piston ring in said groove, said piston ring being of greater internal diameter than the external diameter of the grooved end of the annular piston wall, screw threaded pins secured in said head and extending through said bosses and wrist pin, and means for drawing said pins down to firmly hold the piston head on the grooved end of the annular piston wall.

2. A piston for internal combustion engines, comprising an annular piston wall, having an annular groove in its external face at one end, and formed on its internal wall with bosses, a piston head seated on said grooved end of the annular wall and extending part way over said annular groove, there being an annular shoulder on the lower side of the head bearing against the inner face of the grooved end of the piston wall, screw threaded pins secured in said piston head and extending through apertures in said bosses, nuts on said threaded ends of the pins for drawing said head against the end of the annular piston wall, and a piston ring in said groove, said ring being of greater internal diameter than the external diameter of the grooved end of the annular piston wall.

3. A piston for internal combustion engines, comprising an annular piston wall, having an annular groove in its external face at one end, and having inwardly-projecting apertured wrist pin receiving bosses formed on its internal face, a piston head seated on said grooved end of the annular wall and projecting partly over said groove, threaded pins secured in said head and extending through said bosses, nuts on said threaded ends for holding said piston head on its seat, and a piston ring in said groove, said piston ring being of greater internal diameter than the external diameter of the grooved end of the annular piston wall.

4. A piston for internal combustion engines comprising an annular piston wall open at both ends, and having an annular groove in its external face at one end, and having inwardly projecting bosses on its internal face, a piston ring seated in said groove, there being clearance space between said ring and the bottom of the groove, a hollow piston head of greater diameter than the grooved end of the piston wall seated on said grooved end and closing said end, a plurality of pins secured in said head, and means engaging said bosses for securing the head upon the piston wall.

GEORGE R. RICH.